United States Patent
Budd

(10) Patent No.: US 10,509,563 B2
(45) Date of Patent: Dec. 17, 2019

(54) DYNAMIC MODIFICATION OF DISPLAYED ELEMENTS OF OBSTRUCTED REGION

(71) Applicant: International Business Machines Corporation, Armonk, NY (US)

(72) Inventor: Colin McGrath Budd, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/871,216

(22) Filed: Jan. 15, 2018

(65) Prior Publication Data

US 2019/0220187 A1 Jul. 18, 2019

(51) Int. Cl.
*G06F 3/0488* (2013.01)
*G06F 3/041* (2006.01)
*G06F 3/044* (2006.01)

(52) U.S. Cl.
CPC .......... *G06F 3/04886* (2013.01); *G06F 3/044* (2013.01); *G06F 3/0418* (2013.01); *G06F 2203/0381* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 8,863,042 B2 | 10/2014 | Kulas | |
| 9,469,195 B1 | 10/2016 | Boss et al. | |
| 2006/0284850 A1* | 12/2006 | Tokkonen | G06F 3/0488 345/173 |
| 2014/0092043 A1 | 4/2014 | de Leon et al. | |
| 2014/0253494 A1 | 9/2014 | Jiang et al. | |
| 2016/0240173 A1* | 8/2016 | Bostick | G06F 3/0488 |
| 2017/0147148 A1 | 5/2017 | Townsend et al. | |

* cited by examiner

*Primary Examiner* — Christopher J Kohlman
(74) *Attorney, Agent, or Firm* — Patterson + Sheridan, LLP

(57) ABSTRACT

A method is disclosed, as well as a related input device and computer program product, for use with an input device having an input region at least partly overlapping with a display region of a display device. The method comprises determining an input occurring in the input region, and determining an obstructed region of the display region corresponding to the input. The obstructed region overlaps a displayed element in the display region. The method further comprises determining a relevance of the displayed element to a user interaction with the input device. The user interaction is determined using at least the input. The method further comprises modifying, using the determined relevance, the displayed element to be non-overlapping with the obstructed region.

20 Claims, 10 Drawing Sheets

| | Fig(s) | Input Type | Obstruction Region Location | User Interaction | Overlapped Displayed Element | Relevance Score | Relevance Level | Modification |
|---|---|---|---|---|---|---|---|---|
| 845-1 | 5A, 5B | Inactive | Left Edge of Display Region | Reading | Paragraph (Textual) | 0.85 | High | Text Wrapping |
| 845-2 | 6A, 6B | Active+Inactive | Right Edge of Display Region | Annotating | Chart (Graphical) | 0.75 | High | Position (on) |
| | | | | | UI Toolbar (Graphical) | 0.50 | Med | Position (on), Orientation |
| | | | | | Paragraph (Textual) | 0.30 | Low | Position (off) |
| | | | | | Circle Annotation (Graphical) | 0.90 | High | Position (on) |
| | | | | | Arrow Annotation (Graphical) | 0.82 | High | Shape, Position(on) |
| 845-3 | | Active+Inactive | Right Side of Display Region | Scrolling | Chart (Graphical) | 0.75 | High | Position(on), Sizing |
| | | | | | UI Toolbar (Graphical) | 0.25 | Low | None |
| | | | | | Paragraph (Textual) | 0.30 | Low | None |
| 845-4 | 7 | Active+Inactive | Right Side of Display Region | Highlighting Phrase (Predicted) | Paragraph (Textual) | 0.40 | Med | NA |
| | | | | Highlighting Sentence (Predicted) | Paragraph (Textual) | 0.75 | High | Generate Overlay Including Sentence |
| | | | | Highlighting Paragraph (Predicted) | Paragraph (Textual) | 0.55 | Med | NA |

800 — 805 810 815 820 825 830 835 840

| Fig(s) | Input Type | Obstruction Region Location | User Interaction | Overlapped Displayed Element | Relevance Score | Relevance Level | Modification |
|---|---|---|---|---|---|---|---|
| 5A, 5B | Inactive | Left Edge of Display Region | Reading | Paragraph (Textual) | 0.85 | High | Text Wrapping |
| 6A, 6B | Active+ Inactive | Right Edge of Display Region | Annotating | Chart (Graphical) | 0.75 | High | Position (on) |
| | | | | UI Toolbar (Graphical) | 0.50 | Med | Position (on), Orientation |
| | | | | Paragraph (Textual) | 0.30 | Low | Position (off) |
| | | | | Circle Annotation (Graphical) | 0.90 | High | Position (on) |
| | | | | Arrow Annotation (Graphical) | 0.82 | High | Shape, Position (on) |
| | Active+ Inactive | Right Side of Display Region | Scrolling | Chart (Graphical) | 0.75 | High | Position (on), Sizing |
| | | | | UI Toolbar (Graphical) | 0.25 | Low | None |
| | | | | Paragraph (Textual) | 0.30 | Low | None |
| 7 | Active+ Inactive | Right Side of Display Region | Highlighting Phrase (Predicted) | Paragraph (Textual) | 0.40 | Med | NA |
| | | | Highlighting Sentence (Predicted) | Paragraph (Textual) | 0.75 | High | Generate Overlay Including Sentence |
| | | | Highlighting Paragraph (Predicted) | Paragraph (Textual) | 0.55 | Med | NA |

FIG. 8

DYNAMIC MODIFICATION OF DISPLAYED ELEMENTS OF OBSTRUCTED REGION

BACKGROUND

The present disclosure relates to electronic input devices, and more specifically, to techniques for dynamic modification of displayed elements of an obstructed region of a display region.

SUMMARY

According to one embodiment, a computer-implemented method is disclosed for use with an input device having an input region at least partly overlapping with a display region of a display device. The method comprises determining an input occurring in the input region, and determining an obstructed region of the display region corresponding to the input. The obstructed region overlaps a displayed element in the display region. The method further comprises determining a relevance of the displayed element to a user interaction with the input device. The user interaction is determined using at least the input. The method further comprises modifying, using the determined relevance, the displayed element to be non-overlapping with the obstructed region.

According to another embodiment, an input device comprises one or more computer processors communicatively coupled with a display device and with one or more sensor electrodes. The one or more sensor electrodes define an input region at least partly overlapping with a display region of the display device. The one or more computer processors are configured to determine an input occurring in the input region, and determine an obstructed region of the display region corresponding to the input. The obstructed region overlaps a displayed element in the display region. The one or more computer processors are further configured to determine a relevance of the displayed element to a user interaction with the input device. The user interaction is determined using at least the input. The method is further configured to modify, using the determined relevance, the displayed element to be non-overlapping with the obstructed region.

According to another embodiment, a computer program product comprises a computer-readable storage medium having computer-readable program code embodied therewith. The computer-readable program code is executable by one or more computer processors to determine an input occurring in an input region of an input device. The input region is defined using one or more sensor electrodes and is at least partly overlapping with a display region of a display device. The computer-readable program code is further executable to determine an obstructed region of the display region corresponding to the input. The obstructed region overlaps a displayed element in the display region. The computer-readable program code is further executable to determine a relevance of the displayed element to a user interaction with the input device. The user interaction is determined using at least the input. The computer-readable program code is further executable to modify, using the determined relevance, the displayed element to be non-overlapping with the obstructed region.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 8 is a chart illustrating exemplary modifications of displayed elements using relevance information, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Input devices with display devices are prevalent in society. Typically, users are able to interact with the input devices using fingers and styli. However, when the users interact with an input device, portions of the user (such as fingers, a hand, and/or an arm) can obscure portions of the display device, which can affect the presentation of content displayed on the display device. For example, when a user provides input to an input device by "writing" (e.g., applying a finger or a stylus) on an input surface, the user may have a palm or other portion of his or her hand resting on the input surface. The user's palm may be detected by the input device as an input, even though the user does not intend to provide input via the palm. Due to the obscured portions of the display device, the user may experience difficulty viewing and/or interacting with certain displayed elements.

According to embodiments disclosed herein, the input device is configured to dynamically modify displayed element(s) that are displayed in the obstructed region. In some embodiments, the input device is configured to determine a relevance of the displayed element(s) to a user interaction with the input device, and the displayed element(s) are modified using the determined relevance. The user interaction may be a current user interaction and/or a predicted user interaction.

Figure 1:
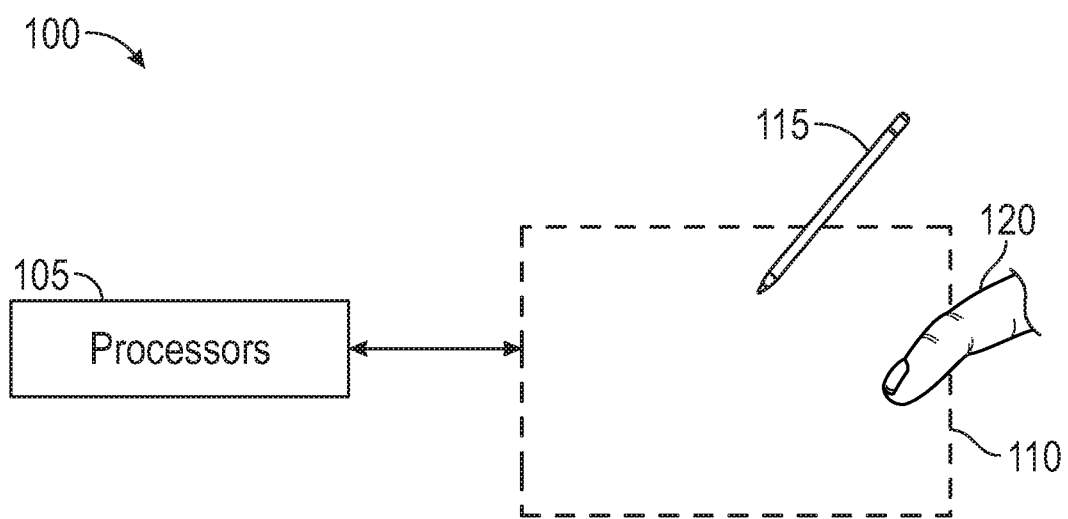
FIG. 1 illustrates an exemplary input device, according to one or more embodiments.

FIG. 1 illustrates an exemplary input device 100, according to one or more embodiments. The input device 100 comprises one or more computer processors 105 that are communicatively coupled with an input region 110 of the input device 100. In FIG. 1, the input device 100 is depicted as a proximity sensor device (also described as a "touchpad"

or a "touch sensor device") that is configured to sense input provided by one or more input objects in the input region 110. The input objects may be passive and/or may comprise electronic circuitry configured to generate one or more signals detectable by the input device 100. Some non-limiting examples of input objects include a stylus 115 and a user's finger 120.

The input region 110 may encompass any space above, around, in and/or near the input device 100 in which the input device 100 is able to detect user input (e.g., provided by one or more input objects 140). The input device 100 may incorporate any suitable technology or technologies for sensing input. Some non-limiting examples of suitable technologies comprise resistive, capacitive, elastive, inductive, magnetic, acoustic, ultrasonic, and/or optical techniques. In some capacitive sensing implementations, the input device 100 comprises a plurality of sensor electrodes that define the input region 110. The computer processors 105 may operate the plurality of sensor electrodes to acquire capacitive measurements using self-capacitance and/or mutual capacitance techniques.

The input device 100 may be implemented in any suitable form. For example, the input device 100 may be integrated into an electronic system or electronic device that is capable of electronically processing information. Some non-limiting examples of electronic systems include personal computers such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras).

Figure 2:
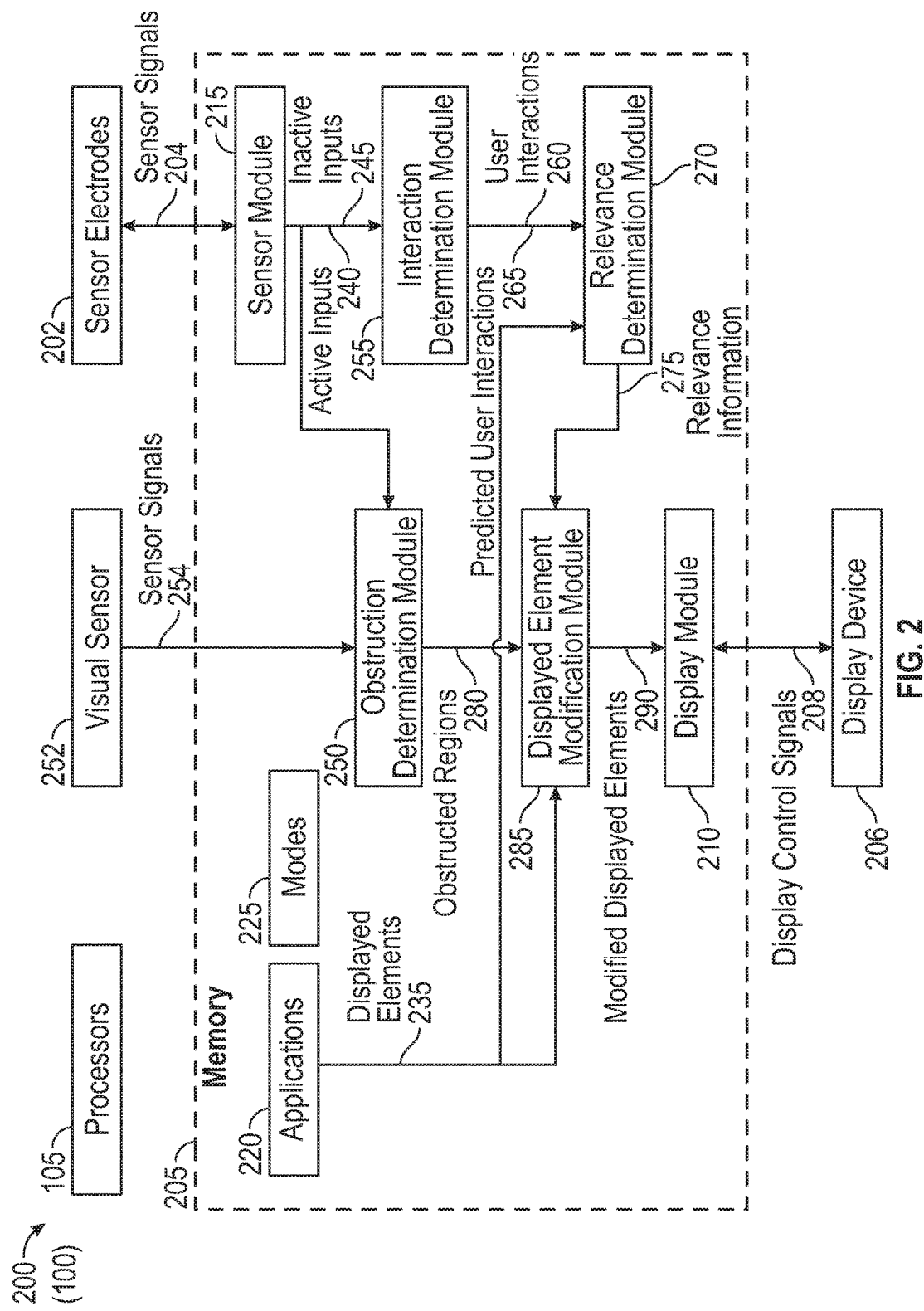
FIG. 2 is a block diagram of an exemplary input device, according to one or more embodiments.

FIG. 2 is a block diagram 200 of an exemplary input device, according to one or more embodiments. For example, the block diagram 200 may represent one possible implementation of the input device 100 of FIG. 1. The input device 100 comprises the one or more computer processors 105, a memory 205, a plurality of sensor electrodes 202, and a display device 206. The one or more computer processors 105 represent any number of processing elements that each can include any number of processing cores. Some non-limiting examples of the one or more computer processors 105 include a microprocessor, a digital signal processor (DSP), an application-specific integrated chip (ASIC), and a field programmable gate array (FPGA), or combinations thereof. In one embodiment, the one or more computer processors 105 comprise a host processor and an ASIC configured to perform display updating using information provided by the host processor.

The memory 205 may comprise volatile memory elements (such as random access memory), non-volatile memory elements (such as solid-state, magnetic, optical, or Flash-based storage), and combinations thereof. Moreover, the memory 205 may be distributed across different mediums (e.g., network storage or external hard drives).

The plurality of sensor electrodes 202 may have any suitable implementation. For an implementation of the input device 100 comprising a touch screen interface, the plurality of sensor electrodes may define an input region at least partly overlapping with a display region (or "active area") of the display device 206. The plurality of sensor electrodes 202 may comprise substantially transparent sensor electrodes overlaying the display region and providing a touch screen interface for the associated electronic system. The display device 206 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

The memory 205 may comprise a plurality of "modules" for performing various functions described herein. In one embodiment, each module includes program code that is executable by one or more of the computer processors 105. However, other embodiments may include modules that are partially or fully implemented in hardware (i.e., circuitry) or firmware of the input device 100. As shown, the memory 205 comprises a display module 210, a sensor module 215, an obstruction determination module 250, an interaction determination module 255, a relevance determination module 270, and a displayed element modification module 285.

The display module 210 comprises circuitry configured to provide various display control signals 208 to update the display device 206. Some non-limiting examples of display control signals 208 include gate driver signals, source driver signals, and a common voltage (or Vcom) signal. The display control signals 208 generally correspond to a plurality of displayed elements 235 generated using one or more applications 220. In some embodiments, the display control signals 208 correspond to one or more modified displayed elements 290, as will be discussed further below.

In some capacitive sensing implementations of the input device 100, the sensor module 215 generally comprises circuitry configured to drive a transmitter signal (or other modulated signal) onto the plurality of sensor electrodes 202, and to receive sensor signals 204 with the plurality of sensor electrodes 202 during periods in which input sensing is desired. The display module 210 may be separate from the sensor module 215, or the display module 210 and the sensor module 215 may comprise shared circuitry.

In some embodiments, the sensor module 215 is configured to determine one or more active inputs 240 and/or one or more inactive inputs 245 based on the received sensor signals 204. More specifically, the sensor module 215 is configured to detect one or more inputs occurring at the plurality of sensor electrodes 202, to determine one or more characteristics of the inputs (e.g., a size, a shape, a length of time, an arrangement of the input relative to other input(s), and so forth), and to determine (or estimate) an intent of the user using the one or more characteristics. As used herein, an "active" input 240 describes an input to the input device 100 that is determined or estimated as being intended by the user as an input, while an "inactive" input 245 is determined or estimated as being not intended by the user as an input. Some non-limiting examples of an active input 240 comprise a touch of a fingertip or an application of a stylus to the input device 100, and some non-limiting examples of an inactive input 245 comprise a user's palm, a portion of the user's hand, the user's finger, or other object resting on the input device 100. Information related to the active inputs 240 and/or the inactive inputs 245 (e.g., type information, size information, shape information, location information relative to the display region, and so forth) may be communicated to the obstruction determination module 250 and to the interaction determination module 255.

The obstruction determination module 250 is configured to determine one or more obstructed regions 280 of the display region that correspond to the active inputs 240 and/or the inactive inputs 245. Stated another way, the one or more obstructed regions 280 are an estimation of how the display region is visually obstructed for a user when an active input 240 and/or an inactive input 245 is applied. The obstructed regions 280 may be provided with any suitable formatting, such as coordinate information relative to the display region. In some embodiments, the one or more obstructed regions 280 are determined using one or more characteristics of the active inputs 240 and/or the inactive inputs 245 (e.g., type information, size information, shape information, arrangement relative to another input, and so forth). In one non-limiting example, the obstruction determination module 250 may generate an elliptical-shaped (e.g., a circle or ellipse) obstructed region 280 corresponding to a hand-rest type of inactive input 245, and the size of the obstructed region 280 may be proportional to the size of the inactive input 245.

The obstruction determination module 250 may determine the one or more obstructed regions 280 based on one or more characteristics of the user. For example, using size information and/or type information of an active input 240 and/or an inactive input 245, the obstruction determination module 250 may infer an age and/or size of the user, and may estimate a viewing distance of the user using this information. The characteristics of the obstruction region 280 may be based on the viewing distance information. In another example, the obstruction determination module 250 may receive identity information for the user.

In some embodiments, the obstruction determination module 250 may use one or more other sensors of the input device 100 to determine a position of the user relative to the display device 206. The characteristics of the obstruction region 280 may be based on the position information. As shown in FIG. 2, the obstruction determination module 250 receives a sensor signal 254 provided by a visual sensor 252 to determine a position of the user relative to the display device 206. Other types of sensors are also contemplated.

The memory 205 further comprises one or more applications 220 that are configured to be executed using the one or more computer processors 105. The one or more applications 220 are configured to generate one or more displayed elements 235, which may comprise textual elements, graphical elements, or combinations thereof. The one or more applications 220 may be broadly interpreted to encompass an operating system (OS) as well as one or more applications executing through the OS. In typical input device implementations, the one or more applications 220 may be configured to communicate the one or more displayed elements 235 to the display module 210 for subsequent display using the display device 206. However, in some embodiments, the one or more displayed elements 235 may be modified using the determined obstructed regions 280, and modified displayed elements 290 may be provided to the display module 210. In some embodiments, a displayed element 235 that is overlapping with an obstructed region 280 is modified to be non-overlapping with the obstructed region 280.

The memory 205 further comprises an interaction determination module 255 that is configured to determine user interactions 260 with the content displayed by the input device 100 (including the one or more displayed elements 235). In some embodiments, the types of the user interactions 260 may be selected from a plurality of predetermined types. Some non-limiting examples of the predetermined types include a "reading" interaction type, a "browsing" interaction type, a "highlighting" interaction type, an "annotating" interaction type, a "textual editing" interaction type, and a "graphical editing" interaction type. Other types of user interactions 260 are also contemplated. The displayed elements 235 may be modified based on the user interactions 260.

The user interactions 260 may be determined using one or more characteristics of the active inputs 240 and/or one or more characteristics of the inactive inputs 245. In one non-limiting example, an active input 240 provided by a stylus and an inactive input 245 provided by a hand rest are concurrently detected by the sensor module 215. Assume that the one or more characteristics of the active input 240 (such as a length of time of applying the stylus, a location of the active input 240, and/or a contour of the active input 240) indicate that the active input 240 corresponds to a writing motion. In this example, the user interaction 260 may be determined to be one of "annotating" and "textual editing".

In another non-limiting example, an inactive input 245 is provided by a user's thumb resting along an edge of the display region, and an active input 240 is provided intermittently by a user's finger. Assume that the one or more characteristics of the active input 240 (such as a length of time of applying the finger, a location of the applied finger, a length of time between applications, and/or a contour of the active input 240) correspond to a "swiping" gesture along a particular direction, consistent with a "scrolling" action. In this example, the user interaction 260 may be determined to be one of "reading" and "browsing".

In some embodiments, the user interactions 260 may be determined based further on the one or more applications 220, and more specifically a current application 220 executed by the one or more computer processors 105. In some embodiments, each application 220 may define specific types of input and/or output for the user interactions 260. For example, an "e-reader" application may comprise a textual and/or graphical display functionality, scrolling and/or other navigation functionality, and a highlighting and/or annotation functionality.

In some embodiments, the interaction determination module 255 may interpret the active inputs 240 and/or the inactive inputs 245 in accordance with the type(s) of input specified for the current application 220. For example, assume that the current application 220 specifies a scrolling functionality but does not specify a highlighting functionality. Responsive to receiving an active input 240 comprising a "swiping" gesture, the interaction determination module 255 may disregard the possibility of a "highlighting" type of the user interaction 260, and may instead interpret the active input 240 as a scrolling functionality and may determine that the user interaction 260 is a "browsing" interaction type.

In some embodiments, the user interactions 260 may be determined based further on one or more operational modes 225 of the input device 100, and more specifically a current operational mode 225. For example, the input device 100 may be configured to selectively operate in an "e-reader" mode, or to selectively operate in a first operational mode 225 having "full" functionality and a second operational mode 225 having a reduced functionality. In some embodiments, each operational mode 225 may define specific types of input and/or output for the user interactions 260. The interaction determination module 255 may interpret the active inputs 240 and/or the inactive inputs 245 in accordance with the type(s) of input specified for the current operational mode 225.

In some embodiments, the interaction determination module 255 is further configured to determine one or more predicted user interactions 265 using the active inputs 240, the inactive inputs 245, and/or the user interactions 260. In one non-limiting example of a predicted user interaction 265, the interaction determination module 255 may determine a "highlighting" type of the user interaction 260. Responsive to an active input 240, the interaction determination module 255 may predict how much of the displayed text will be highlighted by the user in the predicted user interaction 265. The displayed elements 235 may be modified based on the predicted user interaction 265.

The interaction determination module 255 may be configured to access an interaction history reflecting previous user interactions 260 that are associated with the current user and/or previous user interactions 260 that are associated with one or more other users. In some embodiments, the interaction determination module 255 is configured to access interaction correlation information associated with one or more users. The interaction correlation information relates the active inputs 240 and/or the inactive inputs 245 with the previous user interactions 260, and may be provided with any suitable formatting. The interaction determination module 255 may determine the predicted user interaction 265 using the interaction correlation information.

In some embodiments, the interaction determination module 255 may use an artificial neural network (or other suitable modeling or machine learning techniques) to model or otherwise relate the active inputs 240 and/or inactive inputs 245 to the user interactions 260. In some embodiments, the interaction determination module 255 may use an artificial neural network (or other suitable modeling or machine learning techniques) to model or otherwise relate the active inputs 240, the inactive inputs 245, and/or the user interactions 260 to the predicted user interactions 265.

The predicted user interactions 265 may be generated by the interaction determination module 255 based on multiple factors. In some embodiments, the predicted user interactions 265 are generated using one or more of: (1) context information for the type of content being viewed by the user (e.g., based on information associated with the applications 220), (2) the "action path" of the user (e.g., one or more recently-completed actions by the user in combination with the active inputs 240 and/or the inactive inputs 245), and (3) a historical record (or corpus) correlating user actions with the contexts. For example, the historical record may be accessed using the context information and/or the action path to determine a most likely next user action as a predicted user interaction 265.

In one non-limiting example, a user who is reading a document comprising text and imagery may have just highlighted a passage using a stylus. Based on previous user interactions for this type of content conducted by one or both of (1) the particular user and (2) one or more other users, the interaction determination module 255 may determine that one of three actions may occur next: (1) the user will revise the start and end points of the highlighted content (one example of an "active" interaction), (2) the user will continue to read the page (one example of a "passive" interaction), or (3) the user will add notes to annotate the highlighted content (another example of an "active" interaction). A confidence ranking may be assigned to each of these potential next actions based on a multitude of factors, including a location of the highlighting on screen, which content was highlighted, and one or more previous interactions for the user responsive to highlighting content (e.g., compared with other interactions of other users). For purposes of the example, assume that the confidence ranking for annotation is highest, which indicates that the user will most likely add notes to the document following the completion of highlighting a passage.

The memory 205 further comprises a relevance determination module 270 that is configured to determine a relevance between the user interactions 260 (and/or the predicted user interactions 265) and the displayed elements 235. The displayed elements 235 may be modified using relevance information 275 generated by the relevance determination module 270. The relevance information 275 may be generated with any suitable formatting, such as a numerical score or a classification into one or more categories or tiers (e.g., relevant/not relevant, high/medium/low relevance, and so forth).

In some embodiments, the relevance determination module 270 may use one or more characteristics of the displayed elements 235 and/or one or more characteristics of the user interactions 260 (and/or the predicted user interactions 265) to generate the relevance information 275. Different displayed elements 235 may have different relevance for a particular user interaction 260.

In one non-limiting example, type information for the displayed elements 235 (e.g., a textual element, a graphical element) may be compared with type information associated with predetermined types of the user interactions 260. For example, a first display element 235 having type information indicating a graphical element type may have a greater relevance to a user interaction 260 of a "graphical editing" interaction type, as the "graphical editing" interaction type may also have type information indicating a predefined association with a graphical element type. A second display element 235 having type information indicating a textual element may have a lesser relevance to the user interaction 260.

In another non-limiting example, in a "highlighting" type of the user interaction 260, textual elements of the displayed elements 235 will typically have a greater relevance than graphical elements of the displayed elements 235, as it is more likely that user-provided input in the user interaction 260 will relate to highlighting text. The different relevance reflected in the relevance information 275 may be used to prioritize and/or deprioritize certain ones of the displayed elements 235 when modifying the displayed elements 235. Continuing the example, a textual element (having a greater relevance to the user interaction 260) may be modified to be non-overlapping with an obstructed region 280 while a graphical element (having a lesser relevance) may remain overlapping with the obstructed region 280.

In some embodiments, the relevance determination module 270 may use an artificial neural network (or other suitable modeling or machine learning techniques) to model or otherwise relate the displayed elements 235 to the user interactions 260 and/or the predicted user interactions 265.

The memory 205 further comprises a displayed element modification module 285 that is configured to modify one or more of the displayed elements 235 using the obstructed regions 280, as well as the relevance information 275 relating the displayed elements 235 to the user interaction 260 and/or the predicted user interaction 265. The displayed element modification module 285 generates one or more modified display elements 290 that are communicated to the display module 210.

In some embodiments, the displayed element modification module 285 is configured to modify a first displayed element 235 that is determined to be overlapping with the obstructed region 280 to be non-overlapping with the obstructed region 280. In some embodiments, the first displayed element 235 has a greater relevance to a user interaction 260 than a second displayed element 235. Due to the lesser relevance, the second displayed element 235 may be unmodified, may be modified responsive to the modification of the first displayed element 235, may remain overlapping with the obstructed region 280, may be repositioned off-screen, etc.

In some embodiments, the displayed element modification module 285 is configured to perform one or more of: modifying a text wrapping of a textual element, modifying a positioning of a graphical element, and modifying a sizing of the graphical element. In some embodiments, the displayed element modification module 285 is configured to generate an overlay element comprising at least a portion of the displayed element 235.

In some embodiments, the displayed element modification module 285 is configured to dynamically update the modifications based on changes to the obstructed regions 280 and/or to the relevance information 275. For example, responsive to determining that an obstructed region 280 no longer obstructs a displayed element 235 (e.g., the corresponding inactive input 245 has been removed or has moved), the displayed element modification module 285 may modify the displayed element 235 to be overlapping with the obstructed region 280.

The input device 100 may be configured to provide one or more services in addition to the modification performed by the displayed element modification module 285. In some embodiments, the input device 100 may be further configured to determine a dominant hand of the user. Examples of the one or more services comprise automatically switching the active interaction tool type from a "highlighter" function to a "note-taking" tool function, automatically shift content to create a space for annotating inline or in margin of the given document, and/or present an appropriate UI element above and to the left of the user's hand (e.g., as illustrated in FIG. 6B) so as to compensate for the user's dominant hand obstruction and to be within reach of the user's input (e.g., a finger or stylus).

Figure 3:
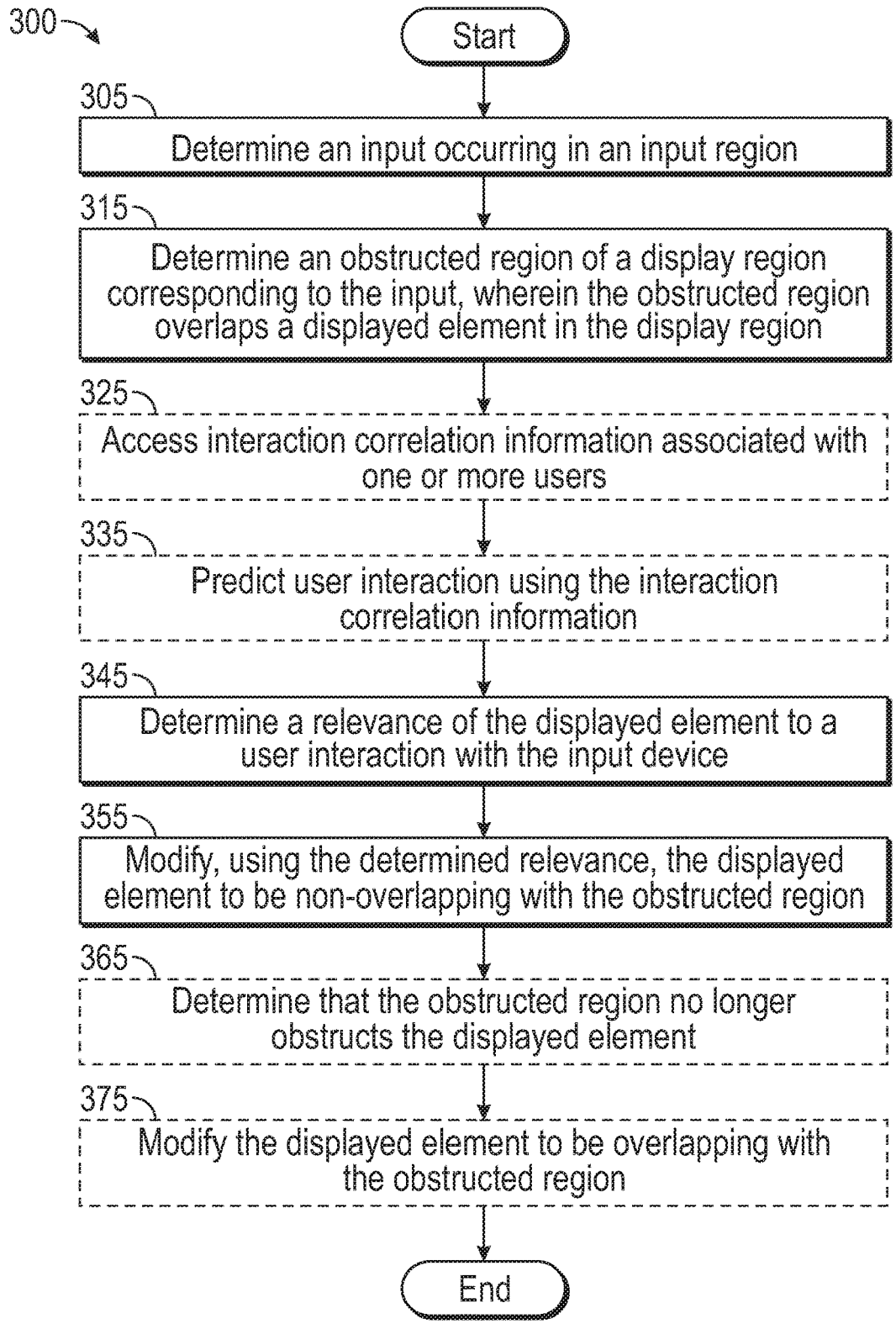
FIG. 3 is an exemplary method for use with an input device, according to one or more embodiments.

FIG. 3 is an exemplary method 300 for use with an input device, according to one or more embodiments. The method 300 may be used in conjunction with other embodiments and features, such as the input device 100 depicted in FIGS. 1 and 2.

The method 300 begins at block 305, where the input device determines an input occurring in an input region. In some embodiments, the input comprises an inactive input. At block 315, the input device determines an obstructed region of a display region corresponding to the input. The obstructed region overlaps a displayed element in the display region.

At an optional block 325, the input device accesses interaction correlation information associated with one or more users. At an optional block 335, the input device predicts a user interaction using the interaction correlation information.

At block 345, the input device determines a relevance of the displayed element to the user interaction with the input device. In some embodiments, the user interaction is determined using at least the input, e.g., using one or more characteristics of an active input or an inactive input. In some embodiments, the user interaction comprises a current user interaction. In other embodiments, the user interaction comprises a predicted user interaction. At block 355, the input device modifies, using the determined relevance, the displayed element to be non-overlapping with the obstructed region.

At an optional block 365, the input device determines that the obstructed region no longer obstructs the displayed element. At an optional block 375, the input device modifies the displayed element to be overlapping with the obstructed region. The method 300 ends following completion of block 375.

Figure 4:
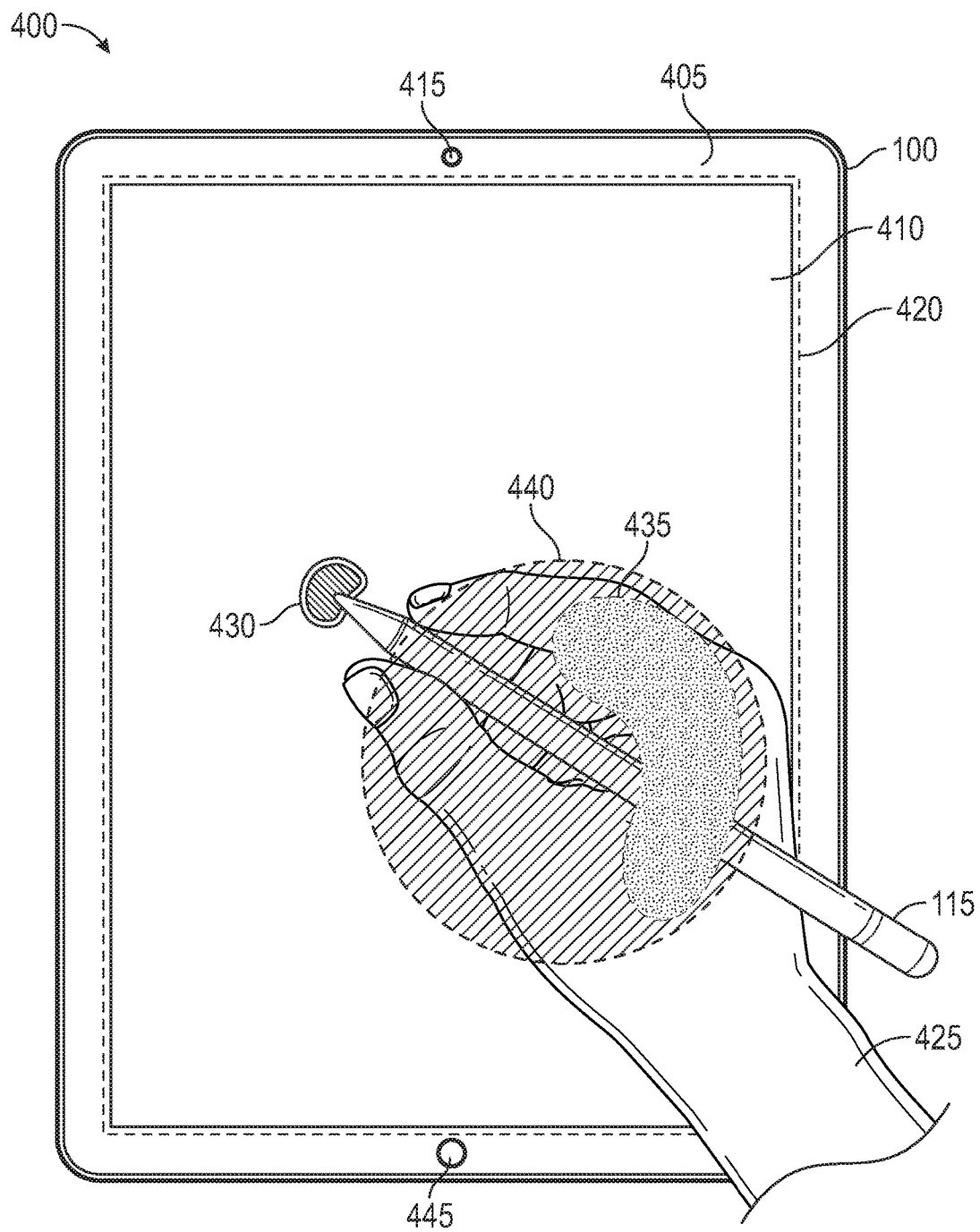
FIG. 4 is a diagram illustrating an exemplary determination of an obstructed region of a display region, according to one or more embodiments.

FIG. 4 is a diagram 400 illustrating an exemplary determination of an obstructed region of a display region, according to one or more embodiments. More specifically, the diagram 400 represents a top view of an exemplary implementation of the input device 100. The features illustrated in FIG. 4 may be used in conjunction with other embodiments and features.

In the diagram 400, the input device 100 is implemented as a tablet computer having an integrated display device. The input device 100 comprises a bezel 405 that circumscribes a display region 410 (or "active area") of the display device. One or more openings may be formed in the bezel 405 to provide additional functionality to the input device 100, such as for a visual sensor 415 and an input button 445.

The input device 100 comprises an input region 420, which in some embodiments is defined by a plurality of substantially transparent sensor electrodes that overlap with the display region 410. As shown, the input region 420 and the display region 410 are substantially coextensive, but this is not a requirement. In one alternate implementation, the input region 420 may extend beyond the display region 410 to provide one or more software-controlled input buttons.

In the diagram 400, a user 425 holds a stylus 115 in his or her hand, and applies the tip of the stylus to a top surface of the input device 100. A portion of the hand of the user 425 rests on the top surface. The input device 100 may determine that the input from the stylus 115 comprises an active input 430, and that the input from the portion of the hand comprises an inactive input 435.

The inactive input 435 may indicate that the user 425 is visually obstructing a portion of the display region 410. In some embodiments, the input device 100 determines an obstructed region 440 of the display region 410 corresponding to the inactive input 435. Although not shown, in some embodiments, the input device 100 may determine the obstructed region 440 to also reflect a visual obstruction related to the active input 430. The obstructed region 440 of the display region 410 will typically be larger than the area defined by the inactive input 435. The obstructed region 440 may be determined based on one or more characteristics of the inactive input 435. For example, using a size and/or shape of the inactive input 435, the input device 100 may determine that the inactive input 435 corresponds to a hand rest and may infer a location of the hand and/or arm of the user 425.

The obstructed region 440 is shown as having an elliptical shape (and more specifically, a circular shape). However, any other suitable shapes are also possible. For example, the obstructed region 440 may alternately have a shape similar to that of the inactive input 435, such as a kidney shape (i.e., substantially a long oval shape with one side indented). As shown, the obstructed region 440 substantially corresponds to the area occupied by the hand of the user 425 (as viewed from the top view). However, any other suitable sizes are also possible. For example, the obstructed region 440 may alternatively have a sizing that corresponds to both the hand and the arm of the user 425.

Figure 5A:
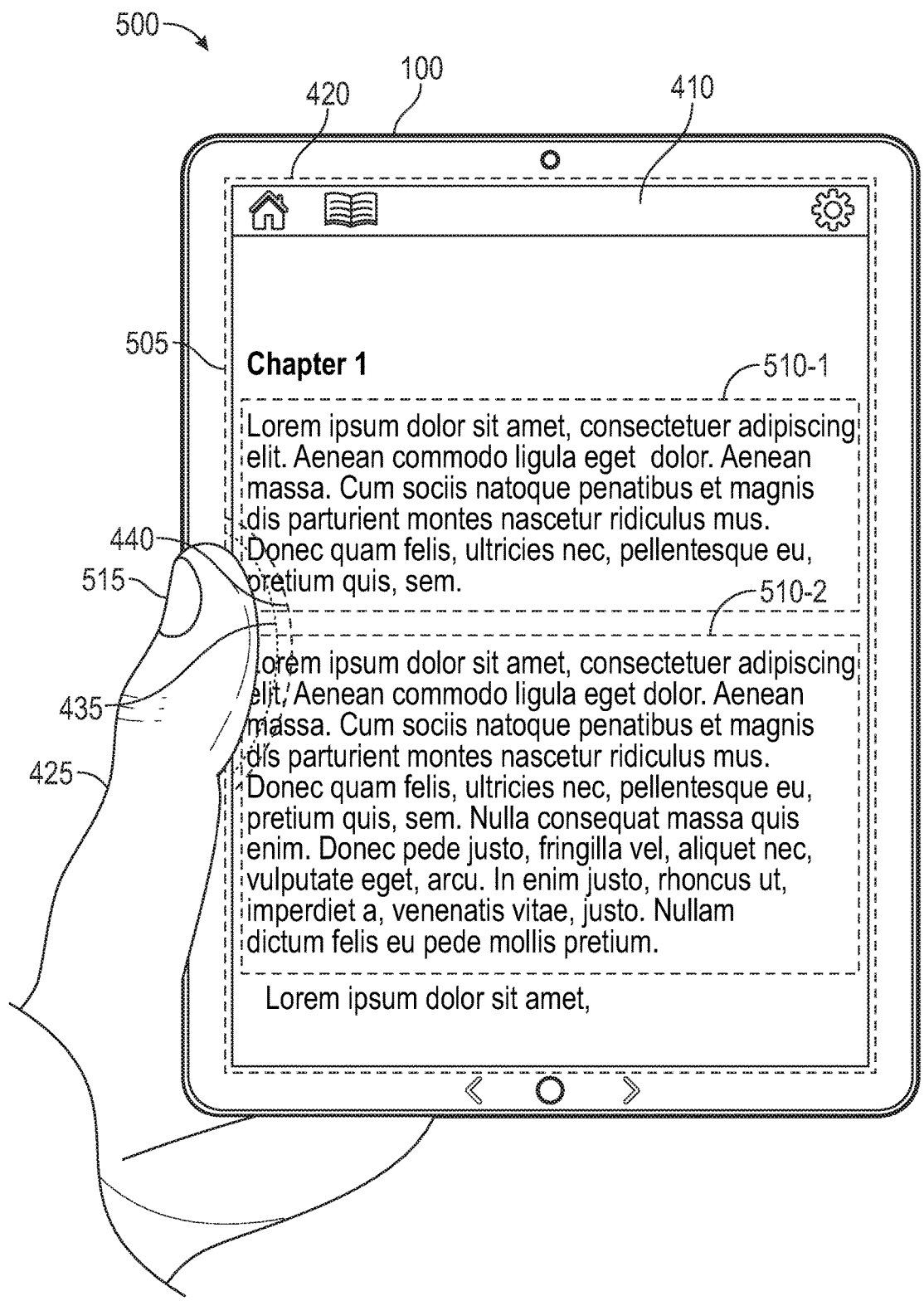
FIGS. 5A and 5B are diagrams illustrating an exemplary modification of displayed elements, according to one or more embodiments.
Figure 5B:
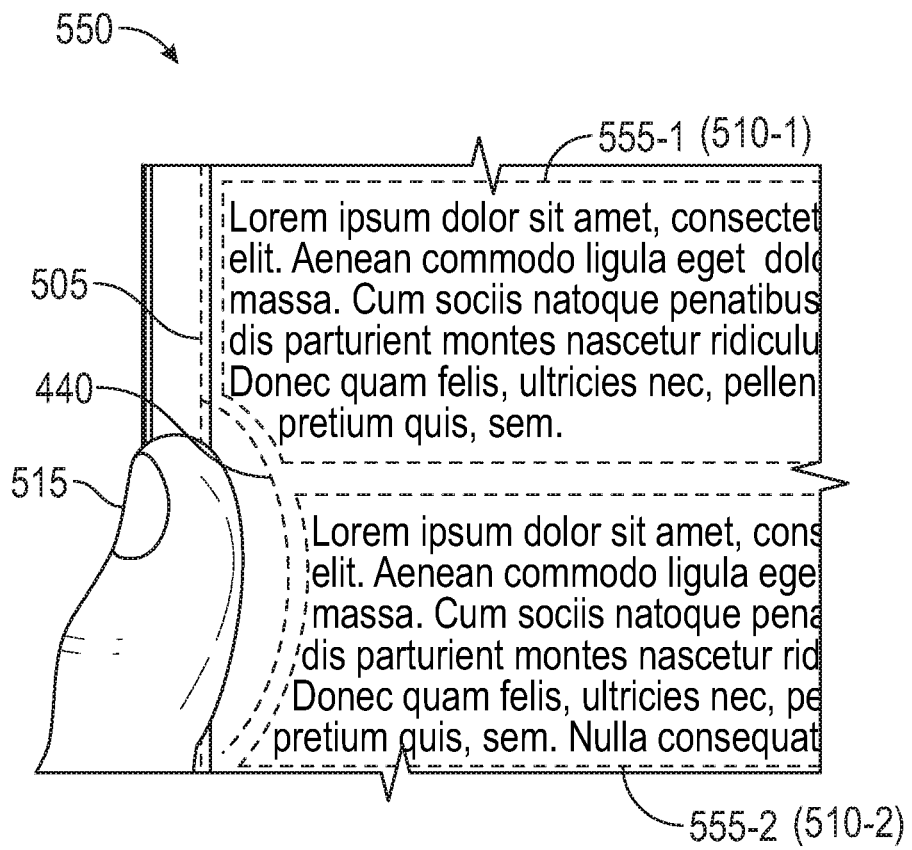

FIGS. 5A and 5B are diagrams 500, 550 illustrating an exemplary modification of displayed elements, according to one or more embodiments. More specifically, the diagrams 500, 550 represent a top view of an exemplary implementation of the input device 100. The features illustrated in the diagrams 500, 550 may be used in conjunction with other embodiments and features.

In the diagram 500, a thumb 515 of the user 425 is resting near a left-side edge 505 of the input device 100, which is consistent with the user 425 gripping the input device 100. The input device 100 determines an inactive input 435 that overlaps with the display region 410, and determines the obstructed region 440 corresponding to the inactive input 435. The obstructed region 440 overlaps two displayed elements 510-1, 510-2 that are displayed in the display region 410. As shown, each displayed element 510-1, 510-2 corresponds to a paragraph of text.

In diagram 550, the input device 100 modifies a text wrapping of the displayed element 510-1 to produce a modified displayed element 555-1, and modifies a text wrapping of the displayed element 510-2 to produce a modified displayed element 555-2. In this way, each of the displayed elements 510-1, 510-2 has been modified to be non-overlapping with the obstructed region 440. Additionally or alternatively, the input device 100 may produce the modified displayed elements 555-1, 555-2 with other modifications, such as modifying a position and/or sizing of the display element 510-1, 510-2.

As discussed above, in some embodiments, the modification to the displayed elements 510-1, 510-2 is determined based on a relevance of the displayed elements 510-1, 510-2 to a current or predicted user interaction. Assuming the user interaction comprises a "reading" interaction type, the text paragraphs of the displayed elements 510-1, 510-2 would likely have a relatively greater relevance than other types of displayed elements. For example, assuming that a graphical element (not shown) with a lesser relevance is also displayed in the display region 410, the graphical element may remain unmodified, modified differently than the displayed elements 510-1, 510-2, moved out of the display region 410 in favor of the modified displayed elements 555-1, 555-2, and so forth.

Figure 6A:
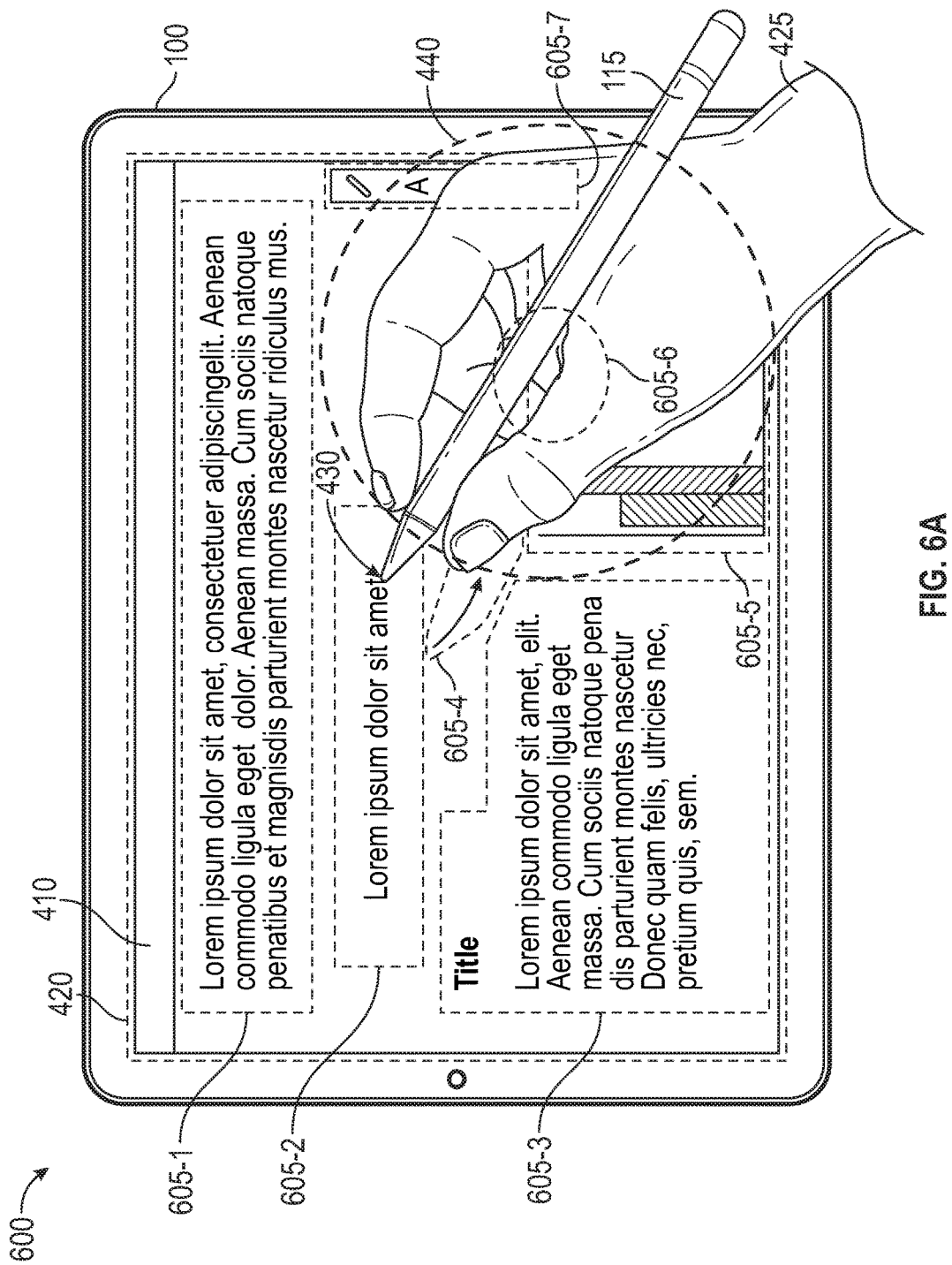
FIGS. 6A and 6B are diagrams illustrating an exemplary modification of displayed elements, according to one or more embodiments.
Figure 6B:
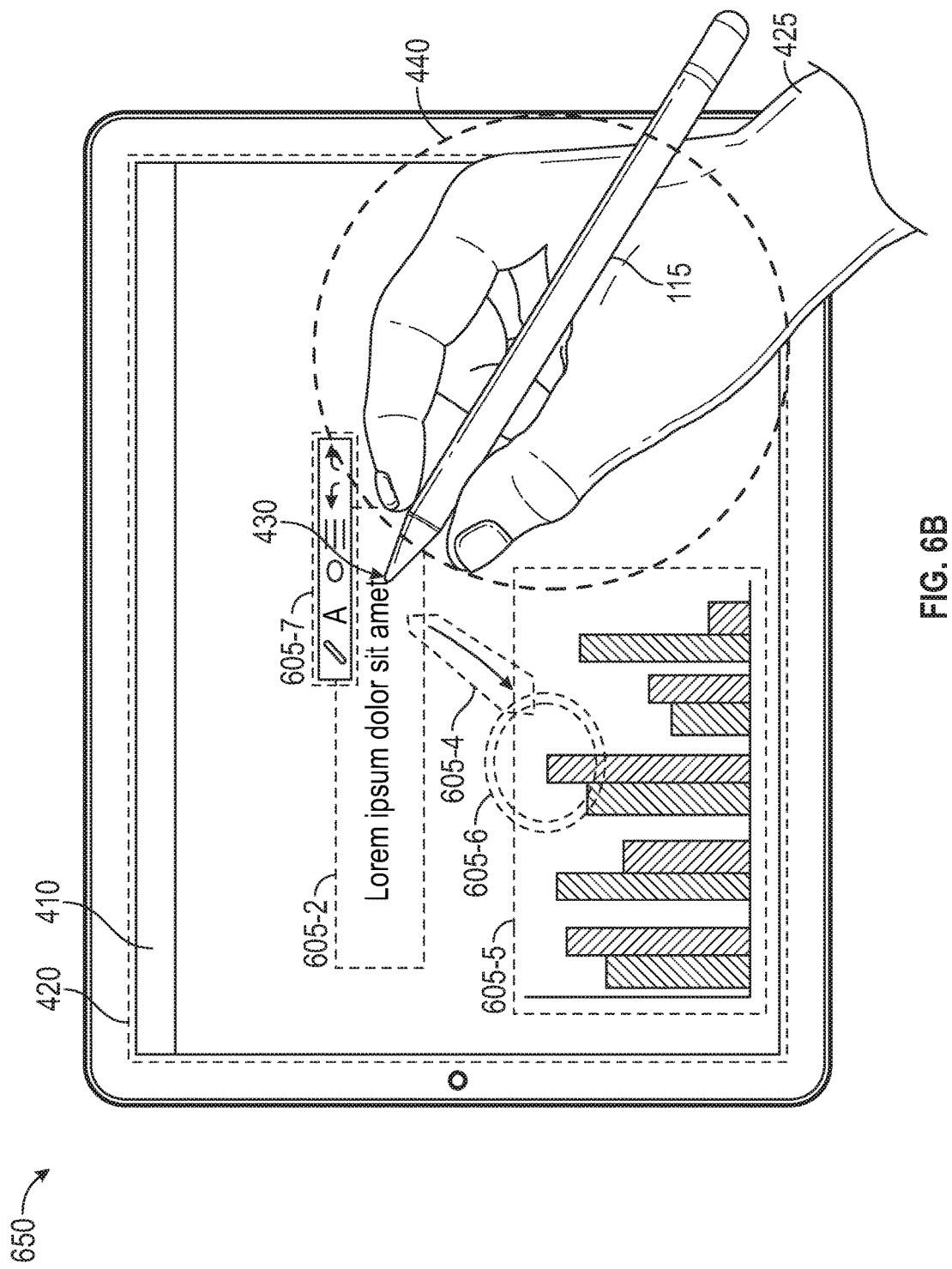

FIGS. 6A and 6B are diagrams 600, 650 illustrating an exemplary modification of displayed elements, according to one or more embodiments. More specifically, the diagrams 600, 650 represent a top view of an exemplary implementation of the input device 100. The features illustrated in the diagrams 600, 650 may be used in conjunction with other embodiments and features.

In the diagram 600, a displayed element 605-1 comprises a textual element, a display element 605-2 comprises a "writing" annotation element corresponding to an active input 430, a displayed element 605-3 comprises a textual element, and a displayed element 605-4 comprises an "arrow" annotation element. A displayed element 605-5 comprising a chart graphical element is partially visually obscured by a hand of the user 425 and partially overlaps with the obstructed region 440, a displayed element 605-6 comprising a "circle" annotation element is visually obscured by the hand and overlaps with the obstructed region 440, and a displayed element 605-7 comprising a user interface (UI) graphical element is partially visually obscured by the hand and partially overlaps with the obstructed region 440. Although not shown, in some embodiments, the obstructed region 440 may be determined to also reflect a visual obstruction related to the active input 430.

In the diagram 650, the input device 100 modifies at least the displayed elements 605-5, 605-6, 605-7, such that each is non-overlapping with the obstructed region 440. As shown, the displayed elements 605-5 (chart), 605-6 (circle) each have at least a modified positioning, and the displayed element 605-7 (UI) has a modified positioning and a reorientation.

As discussed above, in some embodiments, the modification to the displayed elements 605-5, 605-6, 605-7 is determined based on a relevance of the displayed elements 605-5, 605-6, 605-7 to a current or predicted user interaction. Assuming the user interaction comprises an "annotating" interaction type, the annotation elements (i.e., displayed elements 605-2, 605-4, 605-6) would likely have a relatively greater relevance than other types of displayed elements. Further, based on the overlap of the displayed element 605-6 with the displayed element 605-5 and/or the orientation of the displayed element 605-4 to point toward the displayed element 605-5, the input device 100 may determine that the displayed element 605-5 is the subject of at least some of the annotation elements. As a result, the displayed element 605-5 may have an increased relevance to the user interaction. Additionally, the displayed element 605-7 may be positioned closer to the active input 430 for ease of viewing and/or selection.

The input device 100 may modify other displayed elements based on the modifications to the displayed elements 605-5, 605-6, and/or 605-7. For example, the input device 100 modifies at least an orientation of the displayed element 605-4 based on the modification to the displayed elements 605-5, 605-6. In this way, the arrow of the displayed element 605-4 points to the same circle of the displayed element 605-6, which overlaps with a same portion of the chart of the displayed element 605-5.

Figure 7:
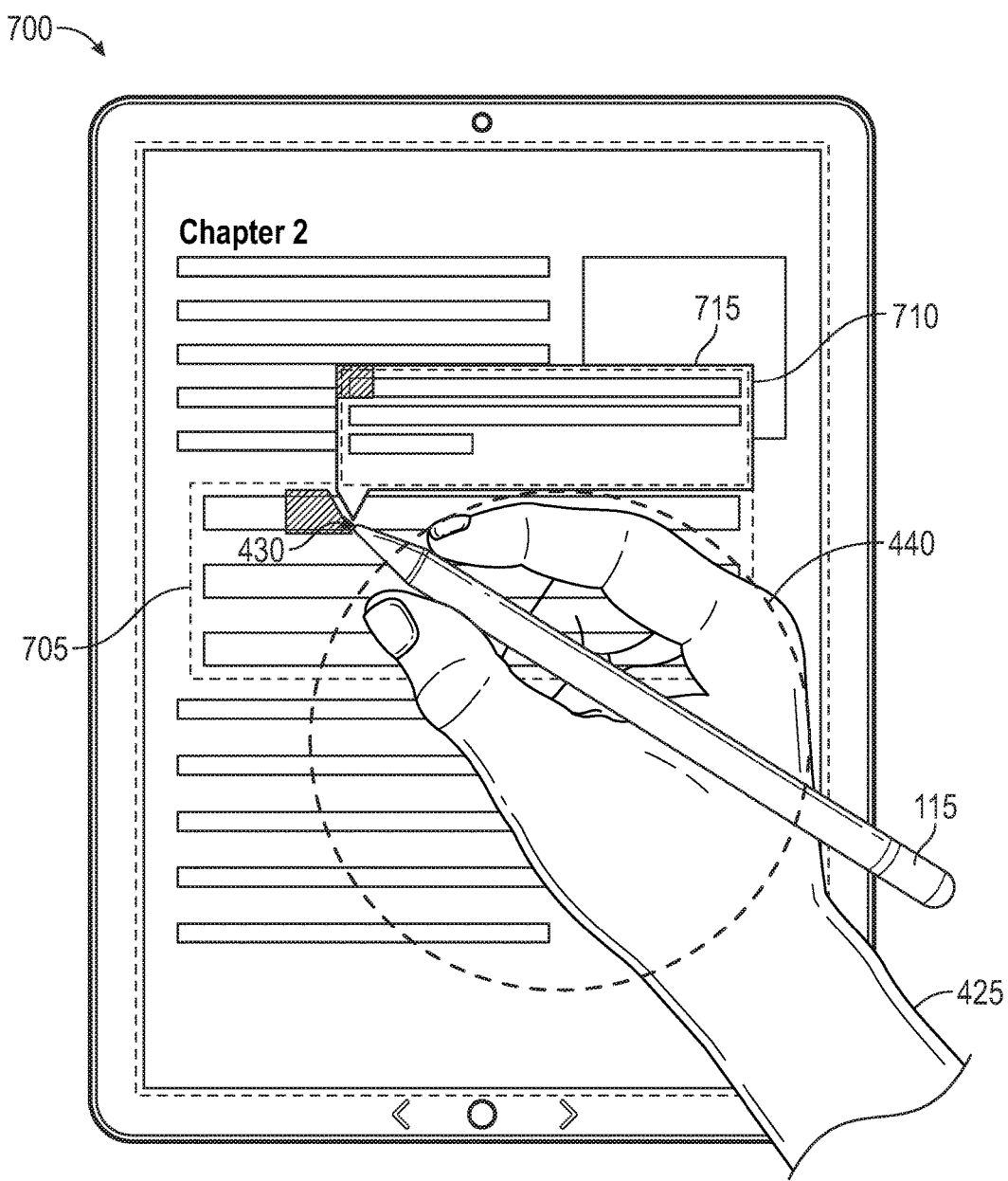
FIG. 7 is a diagram illustrating an exemplary modification of displayed elements, according to one or more embodiments.

FIG. 7 is a diagram 700 illustrating an exemplary modification of displayed elements, according to one or more embodiments. More specifically, the diagram 700 represents a top view of an exemplary implementation of the input device 100. The features illustrated in the diagram 700 may be used in conjunction with other embodiments and features.

In the diagram 700, a displayed element 705 comprising a textual element is overlapped by the obstructed region 440. Although not shown, in some embodiments, the obstructed region 440 may be determined to also reflect a visual obstruction related to the active input 430. As discussed above, in some embodiments, the modification to the displayed element 705 is determined based on a relevance of the displayed element 705 to a current or predicted user interaction. Assuming the user interaction comprises a "highlighting" interaction type, textual elements would likely have a relatively greater relevance than other types of displayed elements.

In some embodiments, the input device 100 determines a predicted user interaction using the active input(s), the inactive input(s), and/or a current user interaction. For example, the predicted user interaction may be one of highlighting a phrase of the displayed element 705, highlighting a sentence of the displayed element 705, and highlighting a paragraph of the displayed element 705.

In the diagram 700, the input device 100 modifies the displayed element 705 by generating an overlay element 710 comprising content 715 of the displayed element 705. The overlay element 710 is non-overlapping with the obstructed region 440. The content 715 represents at least a portion of the displayed element 705 that is overlapped by the obstructed region 440. In some embodiments, the amount of content 715 from the displayed element 705 that is included in the overlay element 710 is based on a relevance of the displayed element 705 to the predicted user interaction. For example, assume that the displayed element 705 is a textual paragraph.

Responsive to receiving an active input 430 from the user 425, the input device 100 may determine that a predicted user interaction of highlighting a sentence has a greatest relevance to a textual paragraph (e.g., a most likely result based on previous user interactions), a predicted user interaction of highlighting the entire paragraph has a second-greatest relevance, and a predicted user interaction of highlighting a phrase has a third-greatest relevance. In such a case, the input device 100 may include at least a sentence of the displayed element 705 in the overlay element 710 (e.g., based on the location of the active input 430 relative to the displayed element 705), but less than the entire paragraph. By considering the determined relevance information, it is more likely that the input device 100 will present the user 425 with the "right" amount of content 715 (e.g., neither too much nor too little content 715).

FIG. 8 is a chart 800 illustrating exemplary modifications of displayed elements using relevance information, according to one or more embodiments. The features illustrated in the chart 800 may be used in conjunction with other embodiments and features. For example, the chart 800 may include exemplary values used by the input device 100 when determining whether to modify displayed elements and/or how to modify the displayed elements.

The chart 800 includes a plurality of input scenarios 845-1, 845-2, 845-3, and 845-4, each of which includes one or both of an active input and an inactive input. The input scenarios 845-1, 845-2, 845-3, and 845-4 are meant as mere examples and are not intended to be limiting of the capabilities or features of the input device. Column 805 indicates Figure(s) that illustrate implementations corresponding to the different input scenarios 845-1, 845-2, 845-3, and 845-4. As shown, the input scenario 845-1 corresponds to FIGS. 5A and 5B, the input scenario 845-2 corresponds to FIGS. 6A and 6B, and the input scenario 845-4 corresponds to FIG. 7.

Column 810 indicates type(s) of the input, column 815 indicates an obstruction region location (referenced to the display region), column 820 indicates a determined or predicted user interaction, column 825 indicates an overlapped displayed element, column 830 indicates a relevance score (as shown, within a range between zero and one) between the overlapped displayed element and the user interaction, column 835 indicates a relevance level corresponding to the relevance score, and column 840 indicates a determined modification for the overlapped displayed element.

For the input scenario 845-1, the input type is an inactive input, the obstruction region location is a left edge of the display region, the determined user interaction is a "reading" interaction type, and the overlapped displayed element is a textual element comprising a paragraph. Assume for purposes of this example that the input device 100 uses a three-tiered relevance classification in which relevance scores that are 0.70 or greater (relevance score ≥0.70) are a "high" relevance level, relevance scores that are greater than or equal to 0.35 and less than 0.70 (0.35≤relevance score <0.70) are a "medium" relevance level, and relevance scores that are less than 0.35 (relevance score ≤0.35) are a "low" relevance level.

For the input scenario 845-1, the input device 100 may determine that the relevance score between the "reading" interaction type and the paragraph is 0.85, corresponding to a "high" relevance level. The determined modification for the paragraph is to modify the text wrapping.

For the input scenario 845-2, the input type is an active input and an inactive input, the obstruction region location is a right edge of the display region, and the determined user interaction is an "annotating" interaction type. A number of displayed elements are overlapped by the obstruction region—a chart has a "high" relevance level (relevance score of 0.75), a UI toolbar has a "medium" relevance level (relevance score of 0.50), a paragraph has a "low" relevance level (relevance score of 0.30), a circle annotation has a "high" relevance level (relevance score of 0.90), and an arrow annotation has a "high" relevance (relevance score of 0.82).

The determined modifications for the input scenario 845-2 are: modifying a position of the chart (on the display region), modifying a position of the UI toolbar (on the display region) and an orientation of the UI toolbar, modifying a position of the paragraph (off the display region), modifying a position of the circle annotation (on the display region), and modifying a shape and/or position of the arrow annotation (on the display region).

For the input scenario 845-3, assume that the displayed elements are similar to those of FIGS. 6A and 6B. The input type is an active input and an inactive input, the obstruction region location is a right side of the display region, and the determined user interaction is a "scrolling" interaction type. A number of displayed elements are overlapped by the obstruction region—the chart has a "high" relevance level (relevance score of 0.75) to the scrolling interaction, the UI toolbar has a "low" relevance level (relevance score of 0.25), and the paragraph has a "low" relevance level (relevance score of 0.30). The relatively low relevance of the UI toolbar and the paragraph may reflect that the user is not likely to use and/or to read these displayed elements during the scrolling interaction, but that the user may more readily identify the chart during the scrolling interaction. The determined modifications for the input scenario 845-3 are: modifying a position of the chart (on the display region) and a sizing of the chart, and leaving the UI toolbar and paragraph unmodified.

For the input scenario 845-4, the input type is an active input and an inactive input, the obstruction region location is a right side of the display region, and the overlapped displayed element is a textual element comprising a paragraph. Several possible predicted user interactions are shown in the chart 800, such that the input device 100 may select one of highlighting a phrase, highlighting a sentence, and highlighting a paragraph.

The paragraph has a "medium" relevance level to highlighting a phrase (relevance score of 0.40), a "high" relevance level to highlighting a sentence (relevance score of 0.75), and a "medium" relevance level to highlighting a phrase (relevance score of 0.55). As the predicted user interaction corresponds to highlighting a sentence, the determined modification for the paragraph is to generate an overlay element including at least a sentence of the paragraph.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for use with an input device having an input region at least partly overlapping with a display region of a display device, the method comprising:
    determining an input occurring in the input region;
    determining an obstructed region of the display region corresponding to the input, wherein the obstructed region overlaps a displayed element in the display region;
    determining, using at least the input, a type of a user interaction with the input device, wherein the type is selected from a plurality of predetermined types describing user interactions with content displayed by the display device;
    determining a relevance of content of the displayed element to the type of the user interaction; and
    modifying, using the determined relevance, the displayed element to be non-overlapping with the obstructed region.

2. The method of claim 1, further comprising:
    accessing interaction correlation information associated with one or more users; and
    predicting the user interaction using the interaction correlation information.

3. The method of claim 2, further comprising:
    categorizing the input as one of an active input and an inactive input,
    wherein predicting the user interaction comprises:
        relating, using the interaction correlation information, the categorized input with one or more previous user interactions.

4. The method of claim 3, further comprising:
    generating a model that relates the one or more previous user interactions with one or more previous inputs, wherein the one or more previous inputs comprise one or more of previous active inputs and previous inactive inputs,
    wherein relating the categorized input with one or more previous user interactions comprises:
        applying the categorized input to the model to predict the user interaction.

5. The method of claim 1, wherein the input device comprises one or more computer processors, and
    wherein determining the relevance of the content of the displayed element is based on one or both of (i) a current application executed by the one or more computer processors, and (ii) a current mode of the input device.

6. The method of claim 5, wherein selecting the type from the plurality of predetermined types comprises:
    based on one or both of (i) the current application and (ii) the current mode of the input device, disregarding one or more types of the plurality of predetermined types.

7. The method of claim 1, wherein modifying the displayed element comprises one or more of:
    modifying a text wrapping when the displayed element comprises a textual element;
    modifying a positioning when the displayed element comprises a graphical element;
    modifying a sizing of the graphical element; and
    generating an overlay element comprising at least a portion of the displayed element.

8. The method of claim 1, further comprising:
    determining that the obstructed region no longer obstructs the displayed element; and
    modifying the displayed element to be overlapping with the obstructed region.

9. The method of claim 1, wherein determining the obstructed region of the display region comprises:
    determining, using a visual sensor of the input device, a position of a user relative to the display device.

10. An input device comprising:
    one or more computer processors communicatively coupled with a display device and with one or more sensor electrodes, wherein the one or more sensor electrodes defines an input region at least partly overlapping with a display region of the display device, wherein the one or more computer processors are configured to:
        determine an input occurring in the input region;
        determine an obstructed region of the display region corresponding to the input, wherein the obstructed region overlaps a displayed element in the display region;
        determine, using at least the input, a type of a user interaction with the input device, wherein the type is selected from a plurality of predetermined types describing user interactions with content displayed by the display device;
        determine a relevance of content of the displayed element to the type of the user interaction; and
        modify, using the determined relevance, the displayed element to be non-overlapping with the obstructed region.

11. The input device of claim 10, wherein the one or more computer processors are further configured to:
    access interaction correlation information associated with one or more users; and
    predict the user interaction using the interaction correlation information.

12. The input device of claim 10, wherein determining the relevance of the content of the displayed element is based on one or both of (i) a current application executed by the one or more computer processors, and (ii) a current mode of the input device.

13. The input device of claim 10, wherein modifying the displayed element comprises one or more of:
   modifying a text wrapping when the displayed element comprises a textual element;
   modifying a positioning when the displayed element comprises a graphical element;
   modifying a sizing of the graphical element; and
   generating an overlay element comprising at least a portion of the displayed element.

14. The input device of claim 10, wherein the one or more computer processors are further configured to:
   determine that the obstructed region no longer obstructs the displayed element; and
   modify the displayed element to be overlapping with the obstructed region.

15. The input device of claim 10, wherein determining the obstructed region of the display region comprises:
   determine, using a visual sensor of the input device, a position of a user relative to the display device.

16. A computer program product comprising:
   a computer-readable storage medium having computer-readable program code embodied therewith, the computer-readable program code executable by one or more computer processors to:
   determine an input occurring in an input region of an input device, wherein the input region is defined using one or more sensor electrodes and is at least partly overlapping with a display region of a display device;
   determine an obstructed region of the display region corresponding to the input, wherein the obstructed region overlaps a displayed element in the display region;
   determine, using at least the input, a type of a user interaction with the input device, wherein the type is selected from a plurality of predetermined types describing user interactions with content displayed by the display device;
   determine a relevance of content of the displayed element to the type of the user interaction; and
   modify, using the determined relevance, the displayed element to be non-overlapping with the obstructed region.

17. The computer program product of claim 16, wherein the computer-readable program code is further executable to:
   access interaction correlation information associated with one or more users; and
   predict the user interaction using the interaction correlation information.

18. The computer program product of claim 16, wherein determining the relevance of the content of the displayed element is based on one or both of (i) a current application executed by the one or more computer processors, and (ii) a current mode of the input device.

19. The computer program product of claim 16, wherein modifying the displayed element comprises one or more of:
   modifying a text wrapping when the displayed element comprises a textual element;
   modifying a positioning when the displayed element comprises a graphical element;
   modifying a sizing of the graphical element; and
   generating an overlay element comprising at least a portion of the displayed element.

20. The computer program product of claim 16, wherein the computer-readable program code is further executable to:
   determine that the obstructed region no longer obstructs the displayed element; and
   modify the displayed element to be overlapping with the obstructed region.

* * * * *